United States Patent
Phillips et al.

(10) Patent No.: US 7,269,464 B2
(45) Date of Patent: Sep. 11, 2007

(54) SYSTEM, METHOD AND COMPUTER PROGRAM PRODUCT FOR PROVIDING AN INTERFACE FOR INSTANTIATING ADDITIONAL PROGRAMMABLE LOGIC CONTROLLER FUNCTIONALITY

(75) Inventors: Scott Phillips, Jonesborough, TN (US); Rick Christiansen, Johnson City, TN (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 232 days.

(21) Appl. No.: 11/099,968

(22) Filed: Apr. 6, 2005

(65) Prior Publication Data

US 2005/0228516 A1    Oct. 13, 2005

Related U.S. Application Data

(60) Provisional application No. 60/561,744, filed on Apr. 13, 2004.

(51) Int. Cl.
*G05B 11/01* (2006.01)

(52) U.S. Cl. ........................................ 700/18

(58) Field of Classification Search ............ 700/18, 700/23, 86, 181, 5, 87; 711/100, 104, 112, 711/147, 149
See application file for complete search history.

(56) References Cited

U.S. PATENT DOCUMENTS

| | | | | |
|---|---|---|---|---|
| 5,377,315 | A * | 12/1994 | Leggett | 345/440 |
| 6,282,454 | B1 * | 8/2001 | Papadopoulos et al. | 700/83 |
| 6,675,226 | B1 * | 1/2004 | Nair et al. | 709/250 |
| 7,110,837 | B2 * | 9/2006 | Oka et al. | 700/87 |
| 7,151,966 | B1 * | 12/2006 | Baier et al. | 700/19 |
| 2003/0023336 | A1 * | 1/2003 | Kreidler et al. | 700/108 |
| 2003/0139821 | A1 * | 7/2003 | Papadopoulos et al. | 700/9 |

* cited by examiner

*Primary Examiner*—Thomas K. Pham (57) ABSTRACT

Embodiments of a system, method and computer program product are described for instantiating additional programmable logic controller (PLC) functionality. In accordance with one embodiment, an extension for a PLC may be identified and loaded into a memory space of the PLC. The loaded extension has an initialization interface that may be exposed to the PLC. When the initialization interface is invoked, functionality of the PLC may be passed to the extension as at least one parameter of the invoked initialization interface. The extension can then be initialized utilizing the passed functionality.

17 Claims, 4 Drawing Sheets

FIG. 1

SYSTEM, METHOD AND COMPUTER PROGRAM PRODUCT FOR PROVIDING AN INTERFACE FOR INSTANTIATING ADDITIONAL PROGRAMMABLE LOGIC CONTROLLER FUNCTIONALITY

CROSS-REFERENCE TO RELATED APPLICATION

This application claims the benefit of U.S. Provisional Application No. 60/561,744 filed Apr. 13, 2004 which is incorporated by reference herein in its entirety.

TECHNICAL FIELD

Embodiments described herein relate generally to programmable logic controllers and more particularly to extending the functionality of a programmable logic controller.

BACKGROUND

Programmable logic controllers (PLCs) typically include a customized piece of hardware that has an instruction set geared for the industrial control industry. This piece of hardware is often referred to as a Hard PLC. A program known as a control program manipulates of memory areas in the PLC that are coupled through other specialized pieces of hardware referred to as I/O modules or systems to machinery (e.g., switches, pumps, motors, machines). The programming language of the control program is usually ladder logic or some other language that typically resembles assembly language. The I/O systems are usually mounted on a rack and can be accessed over a network.

A Soft PLC is a software version of the Hard PLC. Instead of having specialized circuits that execute the control program, a software program running on a general purpose computer (e.g., personal computer (PC)) or special purpose computer executes the control program. The Soft PLC may be coupled to an interface of the computer (e.g., an interface card inserted into a I/O slot of the PC) that in turn may be coupled to an I/O system. In this arrangement, the Soft PLC may interface with the I/O system via the interface card.

Conventional Soft PLCs are typically not very versatile and do not allow easy expansion of their functionality. A traditional approach for incorporating new I/O systems or functionality in a Soft PLC has been to modify and recompile the core functionality or base product of the Soft PLC so that it is capable of supporting the new I/O system and then re-releasing the modified and recompiled Soft PLC base product as a new version.

However, with the availability of more and more third-party I/O systems, the demand for providing versions of Soft PLCs that can incorporate them is increasing. With the inflexibility of the traditional approach, satisfying this demand is becoming more and more problematic because there can be significant delays between the release of a new I/O system and a Soft PLC that incorporate it. The increased demand is also making it more and more difficult to maintain and test the various versions of Soft PLCs created using the traditional approach.

SUMMARY

Embodiments are described for providing an interface for instantiating additional PLC functionality. In particular, various embodiments are described of a method for initializing an extension for a PLC. In one embodiment of the method, an extension for a PLC may be identified and loaded into a memory space of the PLC. When loaded, an initialization interface of the extension may be exposed to the PLC. When the initialization interface is invoked, functionality of the PLC may be passed to the extension as at least one parameter of the invoked initialization interface. The extension can then be initialized utilizing the passed functionality.

In one embodiment, the PLC may comprise a Soft PLC. The extension may be adapted for extending and/or adding functionality to the PLC. In one embodiment, the extension may comprise a plug-in. In another embodiment, the extension may comprise a library such as, for example, a dynamic link library (DLL).

In one embodiment, a registry may be searched to identify the extension. In such an embodiment, the registry may be searched at start up of the PLC. In another embodiment, a determination can be performed to determine whether the extension is compatible with at least one other extension as part of a registration process that registers the extension in the registry (prior to the identification of the extension).

The PLC functionality passed to the extension may be referred to as a PLC interface and may permit the extension to communicate with the PLC. In one embodiment, the passed functionality of PLC may include public functionality of the PLC. In another embodiment, the passed functionality of PLC may include functionality associated with a virtual central processing unit (CPU) and/or I/O manager of the PLC. In such an embodiment, the invoking of the initialization interface may occur before the virtual CPU transitions to a power-on state.

During initialization of the extension, internal functionality of the extension may be initialized. Also, the passed PLC functionality may expose registration(s) of the PLC to the extension during initialization.

In addition to the initialization interface, the extension may have a finalization interface that can be used when finalizing (i.e., terminating) the extension. In such an embodiment, the finalization interface may be exposed to the PLC when the extension is loaded and can be invoked when termination of the extension is desired. When invoked, functionality of the PLC may be passed to the extension as at least one parameter of the invoked finalization interface so that the extension can be finalized utilizing the functions passed via the finalization interface. Finalizing the extension may include, for example, de-registering the extension with one or more PLC registrations made during initialization of the extension. Finalizing may also include releasing one or more resources of the PLC. In one embodiment, finalizing may occur before destruction of a virtual CPU instance of the PLC.

Also described herein are embodiments of a computer program product for initializing an extension for a PLC. In one embodiment, the computer program product may include computer code for identifying an extension for a PLC. Computer code may also be provided for loading the identified extension into a memory space of the PLC. The computer program product may further include computer code for invoking an initialization interface of the extension that is exposed to the PLC and computer code for passing functionality of the PLC as at least one parameter of the invoked initialization interface to the extension. Computer code may also be included for initializing the extension utilizing the passed functionality.

Embodiments of a system for initializing an extension for a PLC are also described herein. The system may include an extension that has an initialization interface and a PLC that has a framework adapted for identifying the extension and loading the extension into a memory space of the PLC. The framework may be further adapted for invoking the initialization interface and passing functionality of the PLC to the extension as a parameter to the invoked initialization interface. In such a system, the extension may be initialized utilizing the passed functionality.

In one embodiment of the system, the extension may include a finalization interface that is exposed to the PLC when the extension is loaded into the memory space. In such an embodiment, the framework may be adapted for invoking the exposed finalization interface and passing functionality of the PLC to the extension as a parameter to the invoked finalization interface so that the passed functionality may be used during finalization of the extension. In further embodiment, the system may include a registry that has a key identifying the extension so that when the registry is search (e.g., by the framework), the extension can be via the key.

DETAILED DESCRIPTION

In general, embodiments of an interface are described herein for adding extensions (e.g., I/O modules or systems) to a PLC and in particular, a Soft PLC, without necessarily requiring changes to the base implementation of the PLC to accommodate the extensions. Some embodiments of the extension interface may help to provide a means for facilitating easier expansion of a PLC without necessarily requiring reconfiguration of the PLC base product. Also, various embodiments of the extension interface may be utilized to assist manufacturers (e.g., Original Equipment Manufacturers (OEMs)) to independently extend and/or add functionality and subsystems to a Soft PLC without requiring the manufacturers to make changes to the base implementation of the Soft PLC.

Illustrations of some of the embodiments presented herein are described in the context of an exemplary Soft PLC available from Siemens A. G. that includes a software application called Windows Logic Controller (WinLC) for simulating a CPU of a PLC. It should be understood that the various embodiments described with these illustrations are not limited to only implementations using a WinLC Soft PLC.

Figure 1:
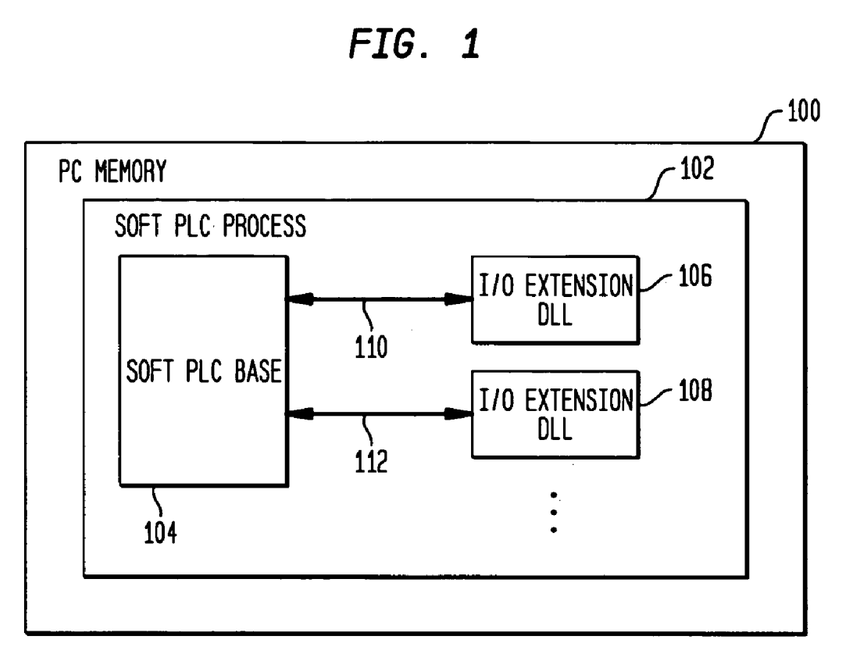
FIG. 1 is a schematic block diagram of a Soft PLC in a memory in accordance with an exemplary embodiment.

FIG. 1 is a schematic block diagram of a representative memory or memory space 100 of a computer, such as, e.g., a personal computer, in which processes of a Soft PLC 102 may be stored in accordance with an exemplary embodiment. As shown in FIG. 1, the Soft PLC 102 may include a core set of functions and/or functionality that may be referred to as the Soft PLC base 104 or "base product." The Soft PLC 102 may also have one or more extensions 106, 108 for extending the functionality of the Soft PLC base 104. While FIG. 1 depicts only a single instance of a Soft PLC 102, it should be understood that embodiments may be implemented where a plurality of Soft PLC instances reside in the memory 100.

The extensions 106, 108 may comprise, for example, I/O extensions for providing additional I/O functions and/or functionality to the Soft PLC 102. In accordance with one embodiment, an extension may comprise a plug-in. A plug-in may be defined as a computer program (e.g., software) or module that adds one or more features and/or functions to another application. As shown in FIG. 1, plug-in modules may be implemented as Dynamic Link Libraries (DLL).

A DLL may be defined as a library of executable functions or data (and can even contain only data). A DLL may provide one or more functions that a program can access by creating either a static or dynamic link to the DLL. A static link typically remains constant during program execution while a dynamic link is created by the program as needed at run time. A DLL may be loaded in response to an explicit application programming interface (API) call made by an executing application or process. When loaded, the DLL may be mapped into an address space of the process at start up or while running. Functions within a DLL may be called (invoked) by an application to perform a desired operation. DLL functions may even be used by more than one running process. A DLL may be used to link the application to hardware. For example, a DLL may permit an application to communicate with a specific device (such a DLL may also be referred to as a "device driver"). In various environments (including a Microsoft Windows operating system (O/S) environment) DLLs can be used as a mechanism to distribute or extend functionality of an application.

As indicated by arrows 110 and 112 in FIG. 1, a Soft PLC 102 may provide a framework for implementing an extension interface for facilitating communication between the Soft PLC base functionality 104 and extensions 106, 108. Embodiments of such an extension interface may be implemented in a manner that enables the addition of functionality and subsystems (e.g., I/O systems) to a Soft PLC 102 without necessarily requiring modification or changes to the Soft PLC base implementation 104. For a Soft PLC capable of running on an operating system that supports DLLs, DLLs may serve as a mechanism for enabling such an extension interface (and thereby extend the functionality of the PLC).

An extension interface of a Soft PLC may include a Soft PLC interface (or "PLC interface") and an extension initialization interface to facilitate communication between the PLC (including the base product) and an extension for enabling the loading and initialization of the extension in a Soft PLC. The extension interface may further include an extension finalization interface for enabling the de-initialization and unloading of an extension from a Soft PLC.

In accordance with one embodiment, basic functionality of a Soft PLC (e.g., functionality defined by the Soft PLC base 104) may be abstracted into groups of basic functionality that collectively (or any portion or sub-combination thereof) may comprise the Soft PLC interface. The abstracted groups of functionality may include, for example:

(a) functions for allowing the addition of I/O systems to a Soft PLC;

(b) I/O functions invoked when reading and writing peripheral data;

(c) functionality for affording the ability to add specific function block(s) to a Soft PLC;

(d) functionality for affording the ability for an extension provider to be notified when their added block(s) is invoked in a PLC;
(e) functionality for affording notifications of configuration block(s) downloads;
(f) functionality for affording the ability to parse configuration block(s) located in a Soft PLC;
(g) functionality for affording access to reading and writing of the operand areas in a Soft PLC; and/or
(h) functionality for affording access to control settings of a Soft PLC (e.g. key-switch transitions).

In accordance with one embodiment, an extension may be implemented to provide the initialization and finalization interfaces for the Soft PLC extension interface. The provided initialization and finalization interfaces may be utilized to allow a Soft PLC framework (e.g., a main application of a Soft PLC) to initialize and/or shutdown the extension's functionality. An extension implemented in such a fashion may be used to provide the additional functionality to a Soft PLC without modifying or recompiling the Soft PLC base product.

An extension may expose its initialization interface to the PLC framework so that the Soft PLC interface can be passed into the extension via the initialization interface and used to initialize the extension. In a similar fashion, an extension may expose its finalization interface to the PLC framework so that the Soft PLC interface can be passed into the extension via the finalization interface and used to de-initialize the extension. In one embodiment, the initialization interface of an extension may be invoked during a startup process of the Soft PLC before the transitioning to a power-on state. In another embodiment, the finalization interface may be invoked after the Soft PLC transitions from the power-on state to a-power-off state.

Figure 2:
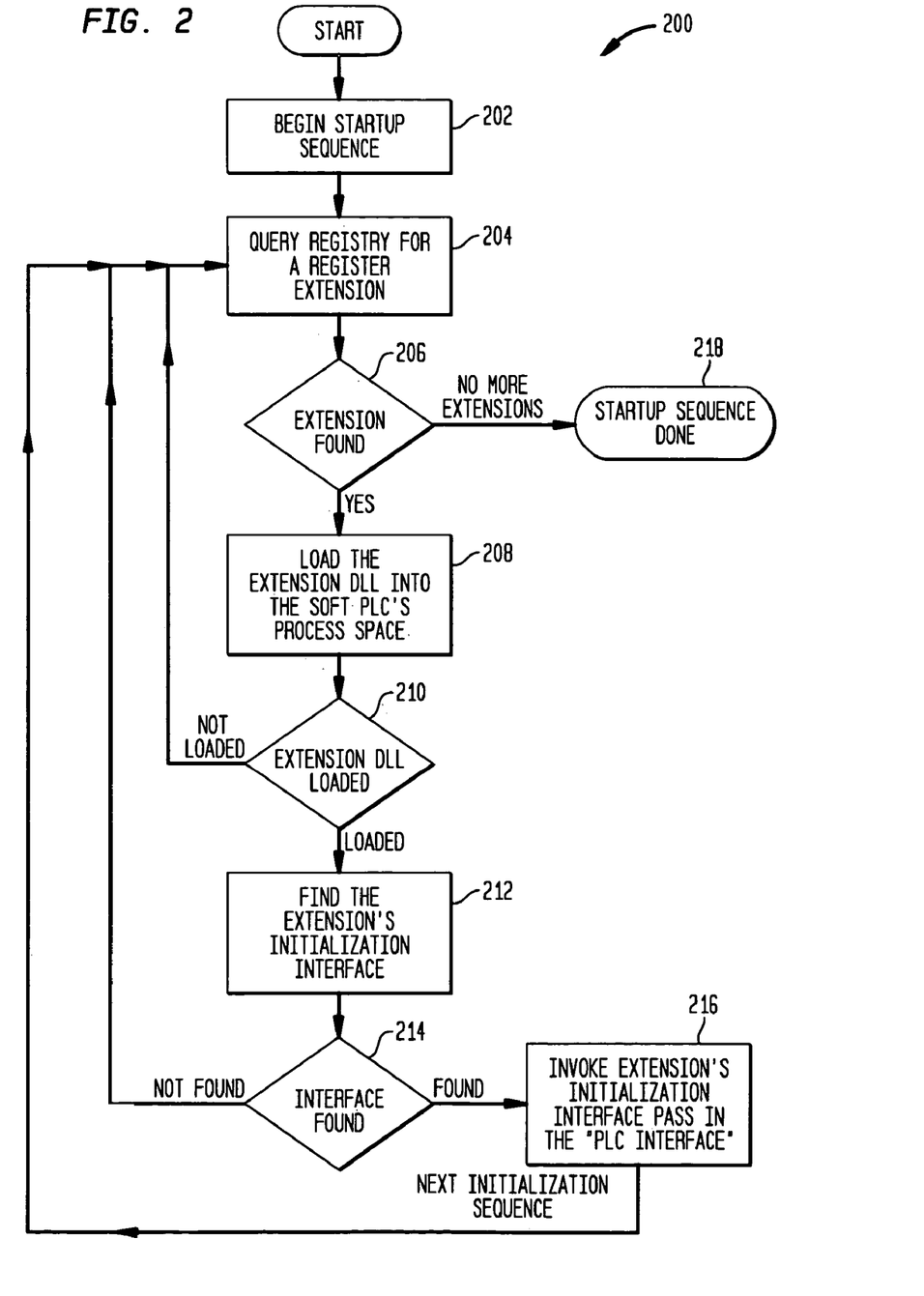
FIG. 2 is a flowchart of a process for loading and initializing extensions into a PLC in accordance with one embodiment.

FIG. 2 is a flowchart of a process 200 for loading and initializing extensions for a Soft PLC in accordance with one embodiment. As set forth in operation 202, this process 200 may begin at the start up of a Soft PLC. The start sequence may include the creation of at least a portion of a Soft PLC interface. In one embodiment, the Soft PLC interface may include functionality related to a virtual CPU and virtual I/O Manager of the Soft PLC. Once the start-up sequence of the Soft PLC has begun, a registry may be queried to find a registered extension in operation 204. Once found (see decision 206), the extension may then be loaded into the Soft PLC in operation 208. In an embodiment where the extension comprises a DLL, the loading of the extension may comprise the loading of extension's DLL into the process space of the Soft PLC. Once loaded (see decision 210), the extension may be queried for its initialization interface in operation 212. Once found (see decision 214), the Soft PLC may then invoke the initialization interface to pass the PLC Interface into the extension as parameters to the call in operation 216 and initialize the extension. After completing the extension's initialization, the process 200 may be reiterated for each registered extension until no more extension are found in the registry (see operation 218).

At startup of a Soft PLC application, the PLC framework may scan a registry for registered extensions (e.g., installed plug-ins). The registry, typically representative of a file, may include entries that establish the existence of Soft PLC components and extensions in the system by name. Each directory entry found in the registry may have a key that names an implementation DLL for the extension that may be loaded and then initialized by a call to an initialization interface included in the implementation DLL of the extension. In an exemplary embodiment, the initialization interface may be named "PLUGIN_Initialization."

It should be noted that in one embodiment, the directory key may also include a key that names a proxy DLL of the extension. The proxy DLL may be loaded via a Soft PLC proxy (e.g., a WinLC proxy) before the creation of a real-time Soft PLC controller (e.g., a WinLC controller).

Table 1 presents an illustrative registry structure with registry keys filled with exemplary data. When an extension is installed, the extension may be registered in the registry utilizing the illustrative registry structure. Such a structure may also be searched by the Soft PLC to identify and locate registered extensions.

TABLE 1

[...\WINLC\_ProductSpecificKey\PlugIn\plugInName]
"Install Name" = "My WinLC Plug-In 1.0"
"ImpDLL" = "abc.dll"
"ImpInitString" = "-n WinLC"
"ProxyDLL" = "proxyABC.dll"
"ProxyInitString" =
"-AuthInterval 420 -AuthMsgBox 1 -AuthEventLog 0"

The entries set forth in Table 1 may be defined as follows:

| | |
|---|---|
| Install Name | provides an installation name for the associated extension. A value for this entry is optional but, if specified, the value should be set equal to the key name of the extension's entry in the registry area: "HKEY_LOCAL_MACHINE\SOFTWARE\Microsoft\Windows\CurentVersion\Uninstall." "HKEY_LOCAL_MACHINE\SOFTWARE\Microsoft\Windows\CurentVersion\Uninstall." If this string is specified, then the extension's uninstall process may be executed as part of the Soft PLC's uninstall process. |
| ImpDLL | an "implementation" DLL of the extension, that if supplied, contains a real-time side of the extension. |
| ImpInitString | an initialization string that may be passed into the implementation DLL of the extension during a call to the extension's initialization interface (e.g., a call to a "PLUGIN_Initialization" function). |
| ProxyDLL | a DLL that, if supplied, may implement non real-time interfaces of the extension. An extension's authorization interface is an exemplary non-real time interface. A non real-time process of the Soft PLC may be utilized load the proxy DLL into the Soft PLC. |

| | |
|---|---|
| ProxyInitString | an initialization string that may be passed into the proxy DLL of an extension during the call to a "PLUGIN_ProxyInitialization" function. |

Figure 3:
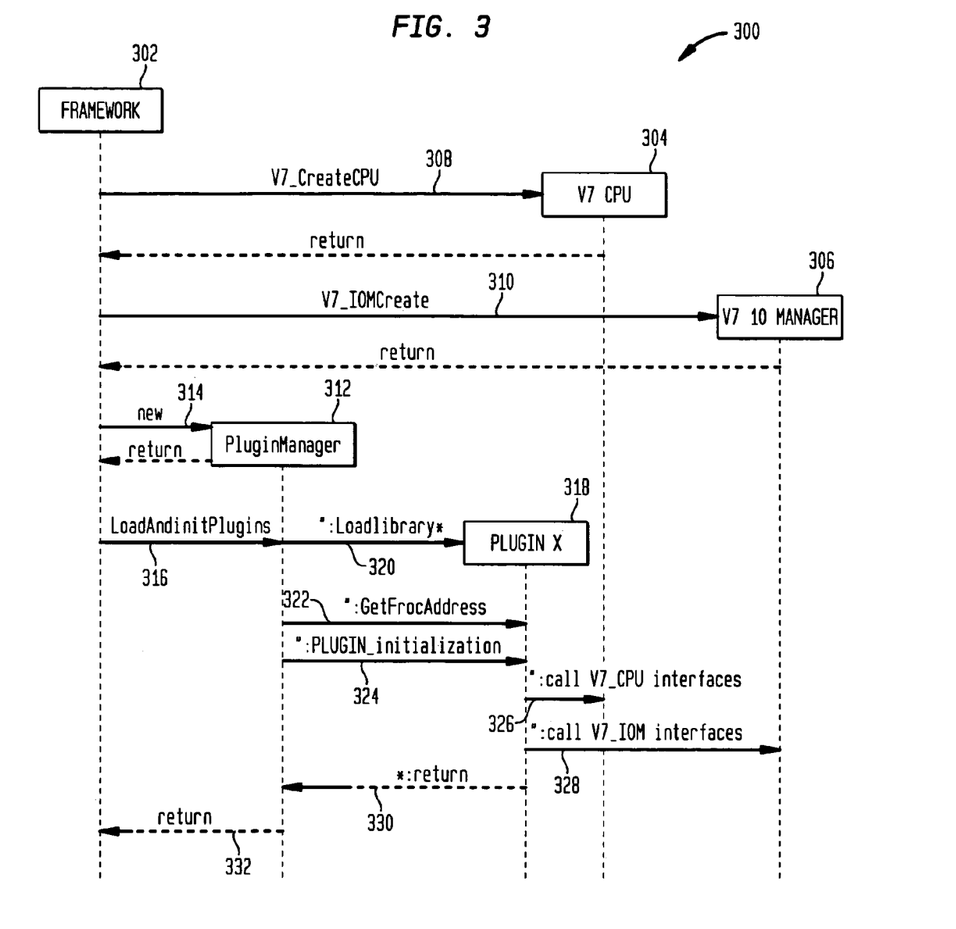
FIG. 3 is a schematic process flow diagram of an exemplary extension initialization sequence in accordance with an illustrative embodiment.

FIG. 3 is a schematic process flow diagram of an exemplary extension initialization sequence 300 for a Soft PLC in accordance with an illustrative embodiment. As shown in FIG. 3, a Soft PLC framework 302 (or "framework") may begin by creating instances of a virtual central processing unit (CPU) 304 (also referred to as a "V7 CPU") and a virtual I/O manager 306 (also referred to as a "V7 I/O Manager") via calls 308 and 310. The framework 302 may also instantiate an extension manager 312 (see operation 314) and instruct the extension manager 312 to load and initialize extensions for the PLC via call 316. In accordance with one embodiment, the creation of the virtual CPU 304, I/O manager 306 and/or the extension manager 312 may be carried out as part of a start up sequence of the Soft PLC. The virtual CPU 304 and I/O manager 306 may also comprise at least a portion of the base product of the Soft PLC.

In invoking call 316, the following sequence may be performed for each extension that is to be loaded and initialized.

The extension manager 312 may issue a call 320 (e.g., "*: LoadLibrary") to load a given extension 318 (e.g., "Plugin X"). The loaded extension 318 may comprise a DLL and, more particularly, in one embodiment the DLL may comprise an implementation DLL for the extension. A LoadLibrary function may be used to map a specified executable module (e.g., an extension) into the address space of a calling process (e.g., a Soft PLC). More specifically, in a MS Windows O/S environment, the LoadLibrary function may be used to map a DLL module and return a handle that may be used in a GetProcAddress function to obtain an address of a specified DLL function.

When the extension is loaded, the extension manager may obtain and invoke an initialization interface of the extension via calls 322 and 324 (e.g., "*: GetProcAddress" and "*: PLUGIN_Intialization"). As shown in illustrative embodiment of FIG. 3, the initialization interface may be referred to by the exemplary function name "PLUGIN_Intialization." As previously mentioned, a GetProcAddress function of call 322 may use a handle returned from the call 320, to the LoadLibrary function for obtaining the address of the PLUGIN_Intialization function so that it may be invoked by call 324.

During invocation of the initialization interface (i.e., call 324), the extension 318 may initialize its internal functionality and register for registrations of the virtual CPU 304 and I/O manager 306 via calls 326 and 328 (e.g., "*: call V7_CPU interfaces" and "*: call V7_IOM interfaces").

After return 330, operations 320-328 may be repeated for each extension to be loaded and initialized for the Soft PLC. The initialization sequence 300 may end with return 332 after all of the extensions have been loaded and initialized.

The initialization interface of an extension may be invoked utilizing an application program interface (API). The following illustration is presented to further describe the invoking of an initialization interface. In this illustration an exemplary API, "WINLCPLUGIN_API," is utilized to invoke an exemplary extension initialization interface, "PLUGIN_Initialization":

```
WINLCPLUGIN_API void PLUGIN_Initialization (
    V7_CPUHDL        cpuHandle,
    void *           iomContext,
    V7_UINT8         facilityNumber,
    V7_FUNCS*        v7Functions,
    IOM_FUNCS*       iomFunctions,
    const char*      initializationArgs);
```

In this illustration, WINLCPLUGIN_API is defined as the declaration "_declspec(dllexport)" (this declaration enables the exporting of functions, data, and objects to a DLL) and the parameters of the initialization interface "PLUGIN_Initialization" are described as:

| | |
|---|---|
| cpuHandle | a handle of a virtual CPU (e.g., V7 CPU) used when invoking methods from the V7_FUNCS structure. |
| iomContext | a context used when invoking methods from the IOM_FUNCS structure. |
| facilityNumber | a unique facility number used for identifying the extension as a source of events, startup obstacles, etc. |
| v7Functions | a pointer to all public virtual functions (e.g., V7 functions). In one embodiment, the v7Functions pointer may be guaranteed to be valid up until the return from a call to the finalization interface of the extension (e.g., "PLUGIN_FinalRelease"). The v7Functions may also point to an initialized V7_FUNCS_EX structure that includes private virtual functions (e.g. private V7 functions such as a complete data block interface). In such an embodiment, it may be valid to cast the v7Functions pointer from the V7_FUNCS structure to the V7_FUNCS_EX structure in order to allow access to the private V7 functions. |
| iomFunctions | a pointer to all public IO Manager functions. In one embodiment, the iomFunctions pointer may be guaranteed to be valid up until the return from a call to the finalization interface of the extension (e.g., "PLUGIN_FinalRelease"). |
| initializationArgs | an initialization arguments (args) string. In one embodiment, the args string is stored in a registry as setup and passed to the | extension during initialization. In another embodiment, the string may have a length of 255 bytes or less.

In an embodiment where the extension DLL uses OS Abstraction Layer (OSAL), an API such as the following exemplary API may be utilized to initialize an OSAL in the DLL in order to use the same global data as the process that loaded it:

```
//Initialize the global OSAL functions
const V7_INTERFACE_DESCR * globalOSALInterface;
V7_ERROR err = g_ODKV7Data.v7Functions->V7_QueryInterface
(cpuHandle,
V7OS_GLOBALDATA_INTERFACE_NAME;
&globalOSALInterface);
if (err = = V7_OK)
{
    V7OS_SetGlobalData (&globalOSALInterface->version,
    reinterpret_castV7OS-GLOBALDATA *> (globalOSALInterface-
>pInterfaceSpecific));
}
```

As previously illustrated, the DLL of an extension (e.g., the implementation DLL) in some embodiments may require a pointer to both the virtual CPU 304 and the virtual I/O Manager 306. For example, during the call to the initialization interface (e.g., during call 324), the extension may initialize some or all of its internal functionality and register for any of the virtual registrations (e.g., V7 registrations) exposed via corresponding pointers (e.g., "V7_FUNCS" and "IOM_FUNCS" pointers/structures). In such embodiments (and as shown in FIG. 3), the initialization of the extension may need to be performed after the creation of virtual CPU and I/O Manager instances. In these embodiments, the initialization interface of an extension may also need to be invoked between the creation of the virtual CPU and before the power-on operation of the virtual CPU.

In accordance with another embodiment, the framework may also ensure that pointers passed to an extension's initialization interface remain valid until after a call to the extension's finalization interface.

In one embodiment, the extension may also be responsible for supplying a proxy DLL. The implementation DLL of an extension may be loaded into the PLC framework by real-time process of the Soft PLC while the proxy DLL (if any) may be loaded into the Soft PLC by non real-time process of the Soft PLC. While an extension may responsible for supplying a proxy DLL, an extension does not necessarily have to supply a proxy DLL. A purpose of the proxy DLL is to supply an authorization interface for the extension. In one embodiment, both the implementation DLL and the proxy DLL interfaces may be implemented in the same binary. In accordance with another embodiment, function(s) exposed by an implementation and/or proxy DLL may need to be declared as extern "C" and be accessible through a Win32GetProcAddress API. In a WinLC Soft PLC, it may be allowed for both the Implementation DLL and the Proxy DLL interfaces to be implemented in the same binary.

Figure 4:
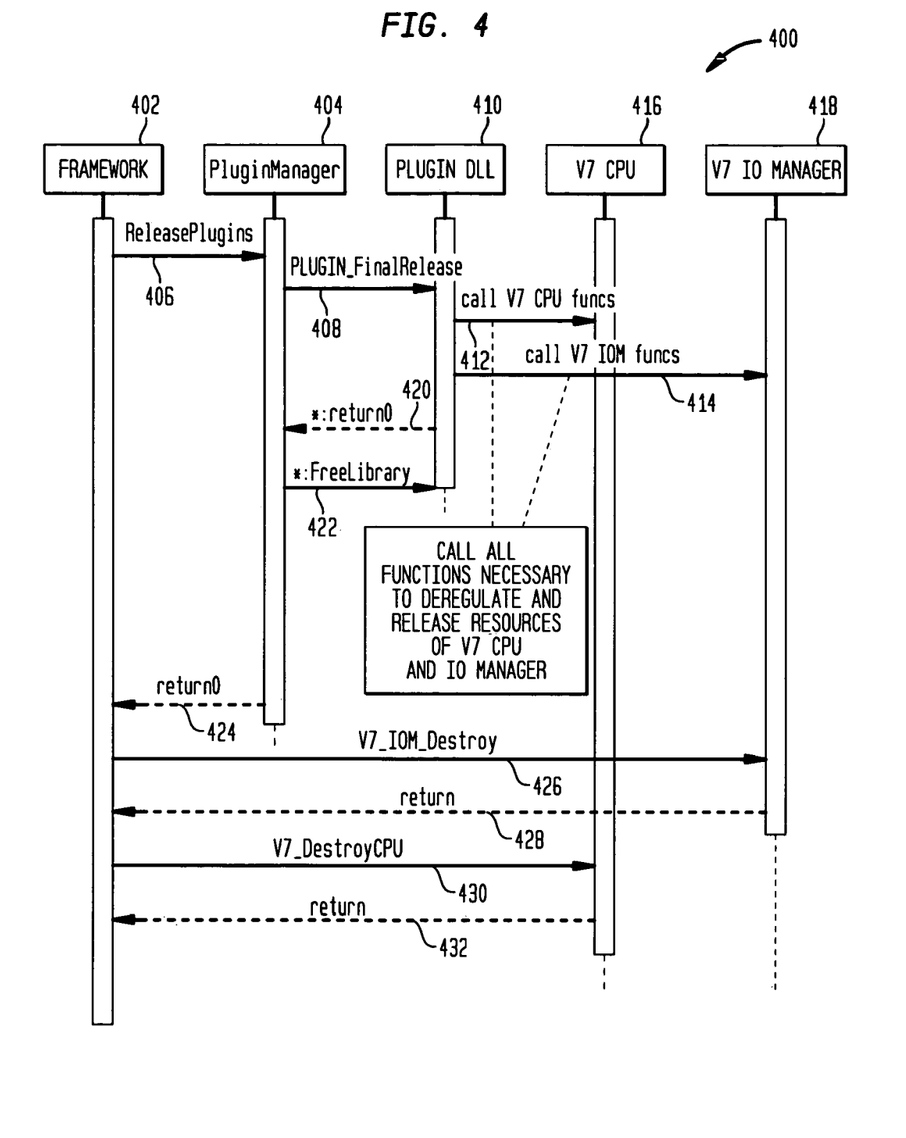
FIG. 4 is a schematic process flow diagram of an exemplary extension finalization sequence in accordance with an illustrative embodiment.

FIG. 4 is a schematic process flow diagram of an exemplary extension finalization sequence 400 for a Soft PLC in accordance with an illustrative embodiment. As shown in FIG. 4, a Soft PLC framework 402 may instruct an extension manager 404 to release all initialized extensions via call 406 (e.g., "ReleasePlugins").

By invoking call 406, the following sequence may be performed for each extension that has been loaded and initialized in the Soft PLC.

The extension manager 404 may issue a call 408 (e.g., "*: PLUGIN_FinalRelase") to a given extension 410 to invoke a finalization interface of the extension 410. As shown in the illustrative embodiment of FIG. 4, the finalization interface may be referred to by the exemplary function name "PLUG-IN_FinalRelase."

During call 408, the extension 410 invokes calls 412 and 414 (e.g., "call V7 CPU funcs" and "call V7 IOM funcs") to functions of a virtual CPU 416 and a virtual I/O manager 418 to deregister prior registrations of the extension 410 with the virtual CPU 416 and virtual I/O manager 418 and to release resources of the virtual CPU 416 and virtual I/O manager 418.

After deregistration and release of the resources (as indicated by return 420), the extension manager 404 may then issue a call 422 (e.g., "*: FreeLibrary") to unload the extension 410 from an address space of the Soft PLC.

Operations 408, 412, 414, 420 and 422 may be performed for each extension that has been loaded and initialized in the Soft PLC in order to deregister and release resources for each extension and unload extension from the address space of the Soft PLC. When all of the extensions have been unloaded (as indicated by return 424), the Soft PLC framework 402 may then issue calls 426 and 430 to destroy the virtual I/O manager 418 and the virtual CPU 416. When the virtual CPU 416 and the virtual I/O manager 418 are destroyed (as indicated by returns 428 and 432) the finalization sequence 400 may be ended.

Like an extension initialization interface, the finalization interface of an extension may also be invoked utilizing an API. The following illustration is presented to further describe the invoking of an finalization interface. In this illustration an exemplary API, "WINLCPLUGIN_API," is utilized to invoke an exemplary extension finalization interface "PLUGIN_FinalRelease":

```
WINLCPLUGLN_API void PLUGIN_FinalRelease (
    V7_CPUHDL          cpuHandle);
```

In this illustration, WINLCPLUGIN_API is defined as the declaration "_declspec(dllexport)"; and the parameters of the extension finalization interface "PLUGIN_FinalRelease" are described as:

cpuHandle the handle of the virtual CPU (e.g., V7 CPU).

In one embodiment, a Soft PLC framework may need to release all previously initialized extensions before destruction of the virtual CPU or the virtual I/O Manager. In such an embodiment, the finalization interfaces of the extensions may be invoked after the power-off operation of a virtual CPU and before the virtual CPU is destroyed. Calling the finalization interface of an extension (e.g., PLUGIN_Final-Release) may be used by the Soft PLC framework to indicate that the shutdown of the virtual CPU and the virtual I/O Manager is nearby. In response, the previously initialized extensions may release virtual resources (e.g., all V7 resources), deregister prior registrations including virtual CPU and virtual I/O Manager registrations (e.g., V7 and IOM registrations), and finish their last accesses to the virtual CPU and the virtual I/O Manager before returning to the caller. The extension may then be removed from memory anytime after the call to the finalization interface. It should be noted that in some embodiments, pointers delivered during the call to the initialization interface (e.g., "PLUGIN_Initialization" function) may not be guaranteed to be valid after the returning from the finalization interface call.

In an implementation where a proxy DLL has been loaded, the proxy DLL may be freed sometime after the destruction of the virtual CPU.

In accordance with one embodiment, an extension interface may also include one or more of the following functionalities:

(a) functionality for allowing an extension to modify an identification number of a Soft PLC (e.g., a MLFB number);
(b) functionality for allowing real-time operations to be preformed as part of the Soft PLC (WinLC) Scan; and
(c) functionality for allowing an extension to check its own authorization.

By having the functionality for allowing an extension to check its own authorization, the extension may not be required to run additional processes in order to check its authorization. The functionality for allowing an extension to check its own authorization may also include a feature for displaying an authorization failure message to a user in a manner standard to the particular implementation of the Soft PLC. In addition, self authorization by the extension may be useful in that it may not impact the Soft PLC's scan.

Modifications to an extension's registry may be performed by an extension's setup program during installation and/or de-installation of the extension (e.g., plug-in install and/or uninstall). In such an embodiment, the setup program may be responsible for determining whether the extension can be installed with the other extensions that have already been installed. This responsibility may be useful in situations where more than one extension is capable of modifying an identification number associated with a Soft PLC (e.g., a MLFB number of WinLC Soft PLC).

As previously mentioned, some Soft PLCs (e.g., WinLC), may allow the modification of an identification number of a Soft PLC (e.g., a MLFB number) via the registry. The following is an illustrative entry in which a MLFB number of a Soft PLC may be stored in a registry:

```
[...\WINLC\_Product SpecificKey]
"MLFB" = "newMLFB"
"MLFBPackageName" = "OptionPackageKeyName"
```

In such an embodiment, if a MLFB key does exist, then a Soft PLC may use this value when reporting its MLFB number. On the other hand, if the MLFB key does not exist, then a default compile time MLFB number may be used.

If a MLFB number exists for the extension when the extension is installed (e.g., during plug-in install), then the Soft PLC may make backup keys for restoring on de-installation of the extension. If the values for the MLFB entries are identical to the values that an extension originally entered, the backup keys may be restored on de-installation.

A Soft PLC may include deterministic and non-deterministic components. In accordance with one embodiment, deterministic may refer to a real-time environment where the scan cycle timing is fixed (non-variable) and provides a real-time execution environment used for processes requiring real-time sensitive processing. Instances of a virtual CPU and I/O manager may comprise a portion of the deterministic (i.e., real-time) side of a Soft PLC.

An operating system (e.g., a Microsoft Windows O/S) may be used as an environment for a Soft PLC application software to run under and interact with the I/O devices. Such an environment may be described as a non-deterministic environment and essentially comprises a non real time environment. The scan cycles of a non-deterministic environment are typical not fixed and their timing can vary from scan to scan.

The various embodiments described herein may be utilized to supply a DLL to an extension provider (i.e., a party that creates and/or supplies extensions for a Soft PLC (e.g., an OEM)) that is capable of exposing the required interfaces of a given extension as well as being capable of accessing the PLC Interface of the Soft PLC. The extension provider may then develop extension functionality separately from the Soft PLC and deliver a DLL containing logic for an extension and thereby facilitate the providing of a new version or variation of the Soft PLC without actually having to make changes to the base Soft PLC logic/functionality. By using such a process, a Soft PLC may be developed and delivered with a well-defined and versioned PLC Interface.

The various embodiments described herein may further be implemented using computer programming or engineering techniques including computer software, firmware, hardware or any combination or subset thereof. While components set forth herein may be described as having various sub-components, the various sub-components may also be considered components of the system. For example, particular software modules executed on any component of the system may also be considered components of the system. In addition, embodiments or components thereof may be implemented on computers having a central processing unit such as a microprocessor, and a number of other units interconnected via a bus. Such computers may also include Random Access Memory (RAM), Read Only Memory (ROM), an I/O adapter for connecting peripheral devices such as, for example, disk storage units and printers to the bus, a user interface adapter for connecting various user interface devices such as, for example, a keyboard, a mouse, a speaker, a microphone, and/or other user interface devices such as a touch screen or a digital camera to the bus, a communication adapter for connecting the computer to a communication network (e.g., a data processing network) and a display adapter for connecting the bus to a display device. The computer may utilize an operating system such as, for example, a Microsoft Windows O/S, a Macintosh O/S, a Linux O/S and/or a UNIX O/S. While Microsoft Windows operating systems are referenced and used in herein as examples, other non-deterministic environments may also be implemented in various embodiments. Those of ordinary skill in the art will appreciate that embodiments may also be implemented on platforms and operating systems other than those mentioned.

Embodiments of the present invention may also be implemented using computer program languages such as, for example, ActiveX, Java, C, and the C++ language and utilize object oriented programming methodology. Any such resulting program, having computer-readable code, may be embodied or provided within one or more computer-readable media, thereby making a computer program product (i.e., an article of manufacture). The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One of ordinary skilled in the art will easily be able to combine software with appropriate general purpose or special purpose computer hardware to create a computer system or computer sub-system for implementing various embodiments described herein.

While various embodiments have been described, they have been presented by way of example only, and not limitation. Thus, the breadth and scope of any embodiment should not be limited by any of the above described exemplary embodiments, but should be defined only in accordance with the following claims and their equivalents.

What is claimed:

1. A method of initializing an extension for a programmable logic controller (PLC), comprising:
    identifying the extension for the PLC;
    loading the identified extension into a memory space of the PLC, the extension having an initialization interface exposed to the PLC, the extension comprising an implementation dynamic link library (DLL) and adapted to supply a proxy DLL, the implementation DLL loaded into a PLC framework by a real-time process, the proxy DLL loaded into the PLC by a non-real time process, the proxy DLL adapted to supply an authorization interface for the extension;
    invoking the initialization interface;
    passing functionality of the PLC as a parameter of the invoked initialization interface to the extension; and
    initializing the extension utilizing the passed functionality.

2. The method of claim 1, wherein the PLC comprises a Soft PLC.

3. The method of claim 1, wherein the extension comprises a plug-in.

4. The method of claim 1, wherein a registry is searched to identify the extension.

5. The method of claim 4, wherein the registry is searched at start up of the PLC.

6. The method of claim 1, wherein the functionality of PLC comprises public functionality of the PLC.

7. The method of claim 1, wherein the functionality of PLC comprises functionality associated with a virtual central processing unit (CPU) of the PLC.

8. The method of claim 7, wherein the invoking of the initialization interface occurs before the virtual CPU transitions to a power-on state.

9. The method of claim 1, wherein the passed parameter exposes a registration of the PLC to the extension.

10. The method of claim 1, further comprising: invoking a finalization interface of the extension;
    passing functionality of the PLC to the extension as a parameter of the invoked finalization interface; and
    finalizing of the extension utilizing the passed parameter of the finalization interface.

11. The method of claim 10, wherein the finalizing of the extension includes de-registering the extension.

12. The method of claim 10, wherein the finalizing of the extension includes releasing a resource of the PLC.

13. The method of claim 10, wherein the finalizing occurs before destruction of a virtual CPU of the PLC.

14. A computer program product for initializing an extension for a programmable logic controller (PLC), comprising:
    computer code for identifying the extension for the PLC;
    computer code for loading the identified extension into a memory space of the PLC, the extension having an initialization interface exposed to the PLC, extension comprising an implementation dynamic link library (DLL) and adapted to supply a proxy DLL, the implementation DLL loaded into a PLC framework by a real-time process, proxy DLL loaded into the PLC by a non-real time process, the proxy DLL adapted to supply an authorization interface for the extension;
    computer code for invoking the initialization interface;
    computer code for passing functionality of the PLC as a parameter of the invoked initialization interface to the extension; and
    computer code for initializing the extension utilizing the passed functionality.

15. A system for initializing an extension for a programmable logic controller (PLC), comprising:
    the extension having an initialization interface;
    the PLC having a framework adapted for identifying the extension and loading the extension into a memory space of the PLC, the extension comprising, an implementation dynamic link library (DLL) and adapted to supply a proxy DLL, the implementation DLL loaded into the framework by a real-time process, the proxy DLL loaded into the PLC by a non-real time process, the proxy DLL adapted to supply an authorization interface for the extension; and
    the framework being further adapted for invoking the initialization interface and passing functionality of the PLC to the extension as a parameter to the invoked initialization interface, wherein the extension is initialized utilizing the passed functionality.

16. The system of claim 15, wherein the PLC comprises a Soft PLC.

17. The system of claim 15, wherein extension has a finalization interface, wherein the framework is adapted for invoking the finalization interface, and passing at least one function of the PLC to the extension as a parameter to the invoked finalization interface for finalizing the extension.

* * * * *